United States Patent
Lai et al.

(10) Patent No.: US 9,057,213 B2
(45) Date of Patent: Jun. 16, 2015

(54) HINGE ASSEMBLY AND ELECTRONIC DEVICE THEREWITH

(71) Applicant: Wistron Corporation, New Taipei (TW)

(72) Inventors: Chi-Hung Lai, New Taipei (TW); Jen-Feng Lin, New Taipei (TW); San-Yang Lo, New Taipei (TW); Shin-Han Wu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 67 days.

(21) Appl. No.: 14/023,441

(22) Filed: Sep. 10, 2013

(65) Prior Publication Data

US 2015/0049427 A1   Feb. 19, 2015

(30) Foreign Application Priority Data

Aug. 19, 2013   (TW) .............................. 102129699 A

(51) Int. Cl.
*E05D 5/02*   (2006.01)
*E05D 7/00*   (2006.01)
*G06F 1/16*   (2006.01)

(52) U.S. Cl.
CPC ................ *E05D 7/00* (2013.01); *G06F 1/1616* (2013.01); *G06F 2200/1612* (2013.01)

(58) Field of Classification Search
USPC ........... 16/387, 385, 281, 239, 225, 226, 229, 16/228, 291, 293; 361/679.08, 679.11, 361/679.02, 679.15, 679.27; 455/90.3, 455/575.1, 575.3, 575.8; 379/433.12, 379/433.13; 348/373, 333.01, 333.06, 794
See application file for complete search history.

(56) References Cited

U.S. PATENT DOCUMENTS

| | | | | |
|---|---|---|---|---|
| 3,629,901 | A * | 12/1971 | Wolf et al. | 16/227 |
| 4,057,165 | A * | 11/1977 | Kardell | 220/6 |
| RE30,861 | E * | 2/1982 | Krawagna | 16/293 |
| 4,424,607 | A * | 1/1984 | Langenhorst | 16/387 |
| 4,727,862 | A * | 3/1988 | Waddell et al. | 602/16 |
| 5,059,017 | A * | 10/1991 | Bennato | 351/121 |
| 5,257,708 | A * | 11/1993 | Dubach | 220/827 |
| 8,607,415 | B2 * | 12/2013 | Bestle | 16/286 |
| 8,813,448 | B1 * | 8/2014 | Rensi | 52/255 |
| 2007/0169309 | A1 * | 7/2007 | Buchegger | 16/228 |
| 2010/0283367 | A1 * | 11/2010 | Coleman et al. | 312/405 |
| 2012/0110784 | A1 * | 5/2012 | Hsu et al. | 16/226 |
| 2012/0137471 | A1 * | 6/2012 | Kujala | 16/382 |

* cited by examiner

*Primary Examiner* — Chuck Mah
(74) *Attorney, Agent, or Firm* — Winston Hsu; Scott Margo

(57) ABSTRACT

A hinge assembly with a moving axis is disclosed. The hinge assembly includes a shaft, a first bracket and a second bracket. The shaft includes a first rod portion and a second rod portion. The first bracket includes a first rotating portion and a first flexibly connecting portion. The first rotating portion is pivoted to the first rod portion of the shaft, and the first flexibly connecting portion extends from the first rotating portion. The second bracket is pivoted to the second rod portion of the shaft and for driving the shaft to activate the first rotating portion such that the first flexibly connecting portion is stretched and bent and the shaft is moved.

13 Claims, 14 Drawing Sheets

HINGE ASSEMBLY AND ELECTRONIC DEVICE THEREWITH

BACKGROUND OF THE INVENTION

1. Field of the Invention

The present invention relates to a hinge assembly and an electronic device therewith, and more particularly, to a hinge assembly with a moving axis and an electronic device therewith.

2. Description of the Prior Art

With development of touch control technology and operating system, a notebook computer with a display module equipped with a touch panel has become a mainstream in the industry. When the aforesaid notebook computer is in use, it provides a user not only with a conventional notebook computer mode but also with a tablet computer mode that the display module is turned over and laid on a host module of the notebook computer such that the touch panel faces the user for performing touch control operations thereon.

Conventionally, there is a recess formed on a casing of the display module of the aforesaid notebook computer. When the notebook computer is in the tablet computer mode, a linkage member of a hinge assembly of the notebook computer is contained in the recess. It facilitates the user to stably operate the notebook computer in the tablet computer mode that a back side of the display module is completely held by the host module. However, the recess results in an appearance issue of notebook computer and thus disadvantages the notebook computer in the market.

SUMMARY OF THE INVENTION

Thus, the present invention provides a hinge assembly with a moving axis and an electronic device therewith for solving above drawbacks.

According to an embodiment of the present invention, a hinge assembly includes a shaft, a first bracket and a second bracket. The shaft includes a first rod portion and a second rod portion. The first bracket includes a first rotating portion and a first flexibly connecting portion. The first rotating portion is pivoted to the first rod portion of the shaft, and the first flexibly connecting portion extends from the first rotating portion. The second bracket is pivoted to the second rod portion of the shaft and for driving the shaft to activate the first rotating portion such that the first flexibly connecting portion is stretched and bent and the shaft is moved.

According to another embodiment of the present invention, the second bracket includes a second rotating portion and a second flexibly connecting portion. The second rotating portion is pivoted to the second rod portion of the shaft, and the second flexibly connecting portion extends from the second rotating portion. The second flexibly connecting portion stretches and bends when the second bracket rotates relative to the first bracket.

According to another embodiment of the present invention, the first bracket further includes a first fixing portion connecting the first flexibly connecting portion and for fixing on a first casing, and the second bracket further includes a second fixing portion connecting the second flexibly connecting portion and for fixing on a second casing. The second casing activates the second bracket to drive the shaft when the second casing rotates relative to the first casing such that the first rotating portion is activated to stretch and bend the first flexibly connecting portion, and the second fixing portion is activated to stretch and bend the second flexibly connecting portion when the second casing rotates relative to the first casing and the second bracket rotates relative to the first bracket.

According to another embodiment of the present invention, at least one first through hole is formed on the first fixing portion and for fixing on the first casing, and at least one second through hole is formed on the second fixing portion and for fixing on the second casing.

According to another embodiment of the present invention, the hinge assembly further includes a bushing member sheathing the shaft, and two sides of the bushing member respectively abut against the first rotating portion of the first bracket and the second rotating portion of the second bracket.

According to another embodiment of the present invention, a first pivotal hole is formed on the first rotating portion, the first pivotal hole is for rotably sheathing the first rod portion of the shaft, a second pivotal hole is formed on the second rotating portion, the second pivotal hole is for rotably sheathing the second rod portion of the shaft.

According to another embodiment of the present invention, the first flexibly connecting portion and the second flexibly connecting portion are respectively a substantially wave-shaped structure.

According to another embodiment of the present invention, the first flexibly connecting portion is a substantially wave-shaped structure.

According to another embodiment of the present invention, an electronic device includes a linkage member, a first module, a second module and a hinge assembly. The linkage member includes a first casing, and the first module pivoted to a first side of the first casing. The second module includes a second casing, and the hinge assembly is installed on a second side of the first casing relative to the first side and for pivoting the linkage member and the second module. The hinge assembly includes a shaft, a first bracket and a second bracket. The shaft includes a first rod portion and a second rod portion. The first bracket is fixed on the first casing and includes a first rotating portion and a first flexibly connecting portion. The first rotating portion is pivoted to the first rod portion of the shaft, and the first flexibly connecting portion extends from the first rotating portion. The second bracket is fixed on the second casing and pivoted to the second rod portion of the shaft. The second bracket is for driving the shaft to activate the first rotating portion so as to stretch and bend the first flexibly connecting portion for displacing and moving the shaft.

In summary, in the process that the second casing rotates relative to the first casing along the first direction, the first flexibly connecting portion and the second flexibly connecting portion of the hinge assembly of the present invention are stretched and bent so as to displace and move the shaft of the hinge assembly to the side of the first casing. In other words, the shaft of the hinge assembly of the present invention displaces and moves when the second casing rotates relative to the first casing such that the second casing rotates relative to the first casing for overlapping with and lying on the first casing. In other words, the hinge assembly of the present invention is capable of changing the axis position of the shaft such that the second casing does not interfere with the first casing when the second casing rotates relative to the first casing. In such a manner, it does not need to form a recess on the second casing. Thus, it improves an appearance issue of electronic device resulting from the recess and advantages the electronic device in the market.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
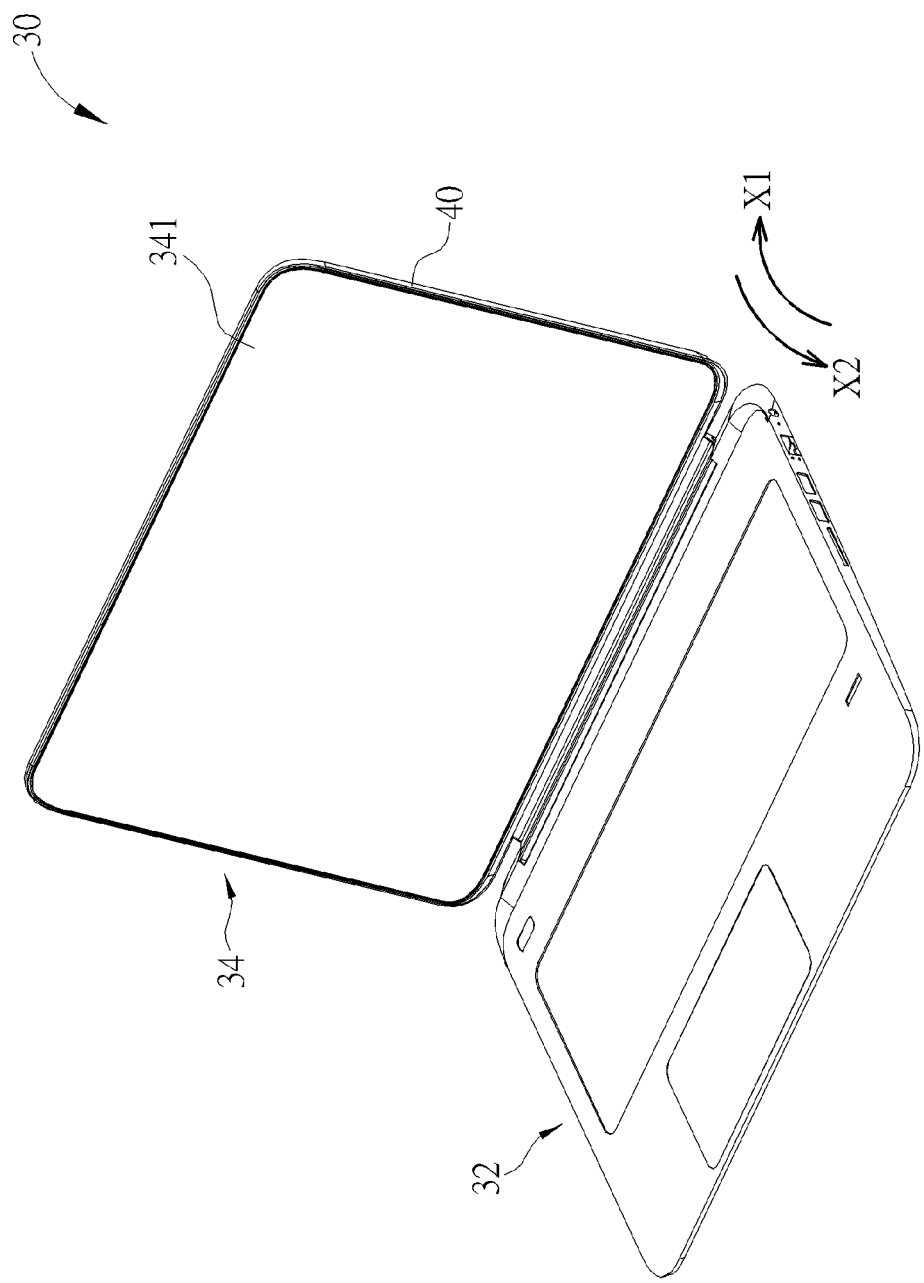
FIG. 1 is a diagram of an electronic device in an expanded status according to an embodiment of the present invention.
Figure 2:
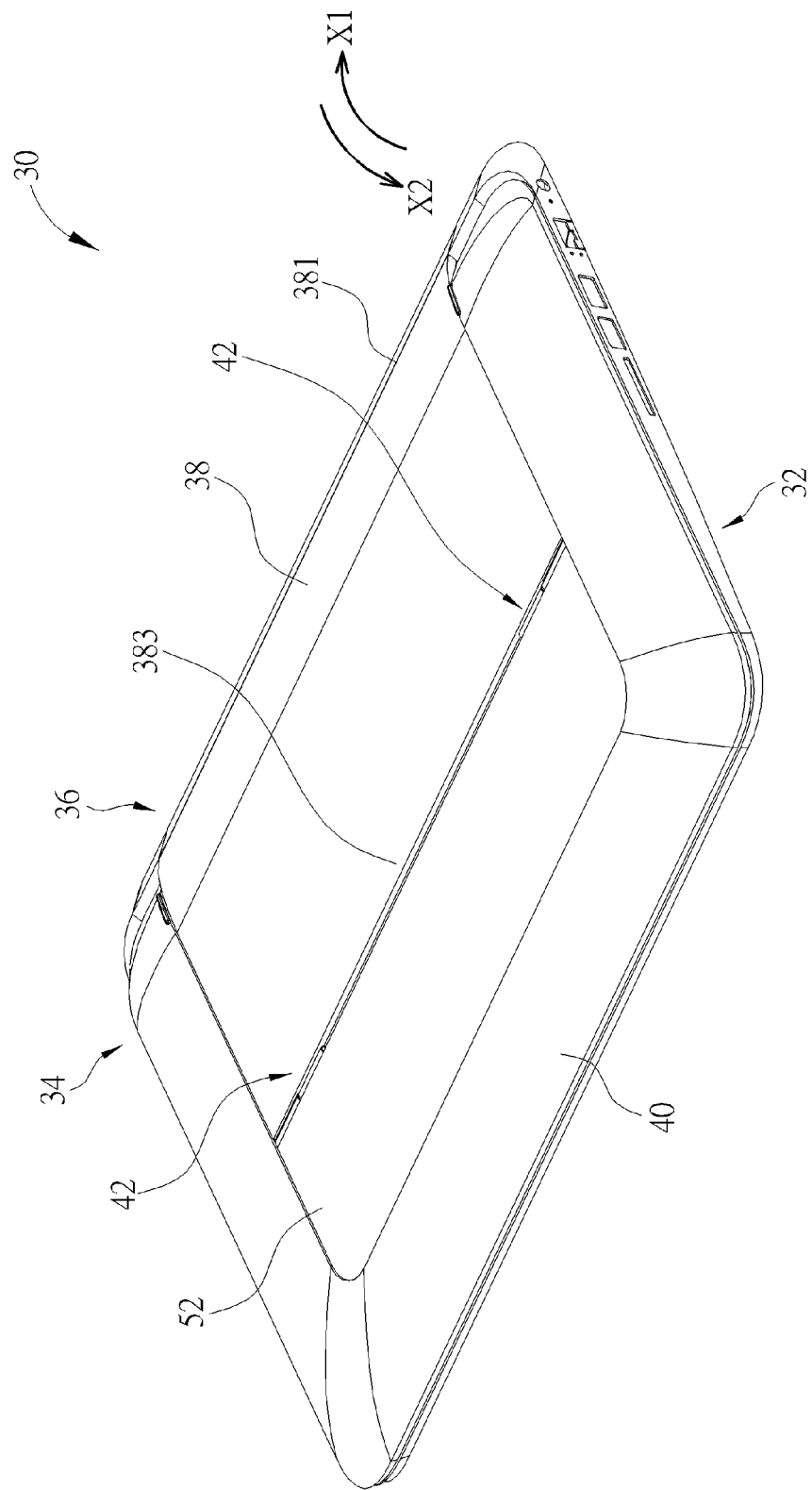
FIG. 2 is a diagram of the electronic device in a contained status according to the embodiment of the present invention.
Figure 3:
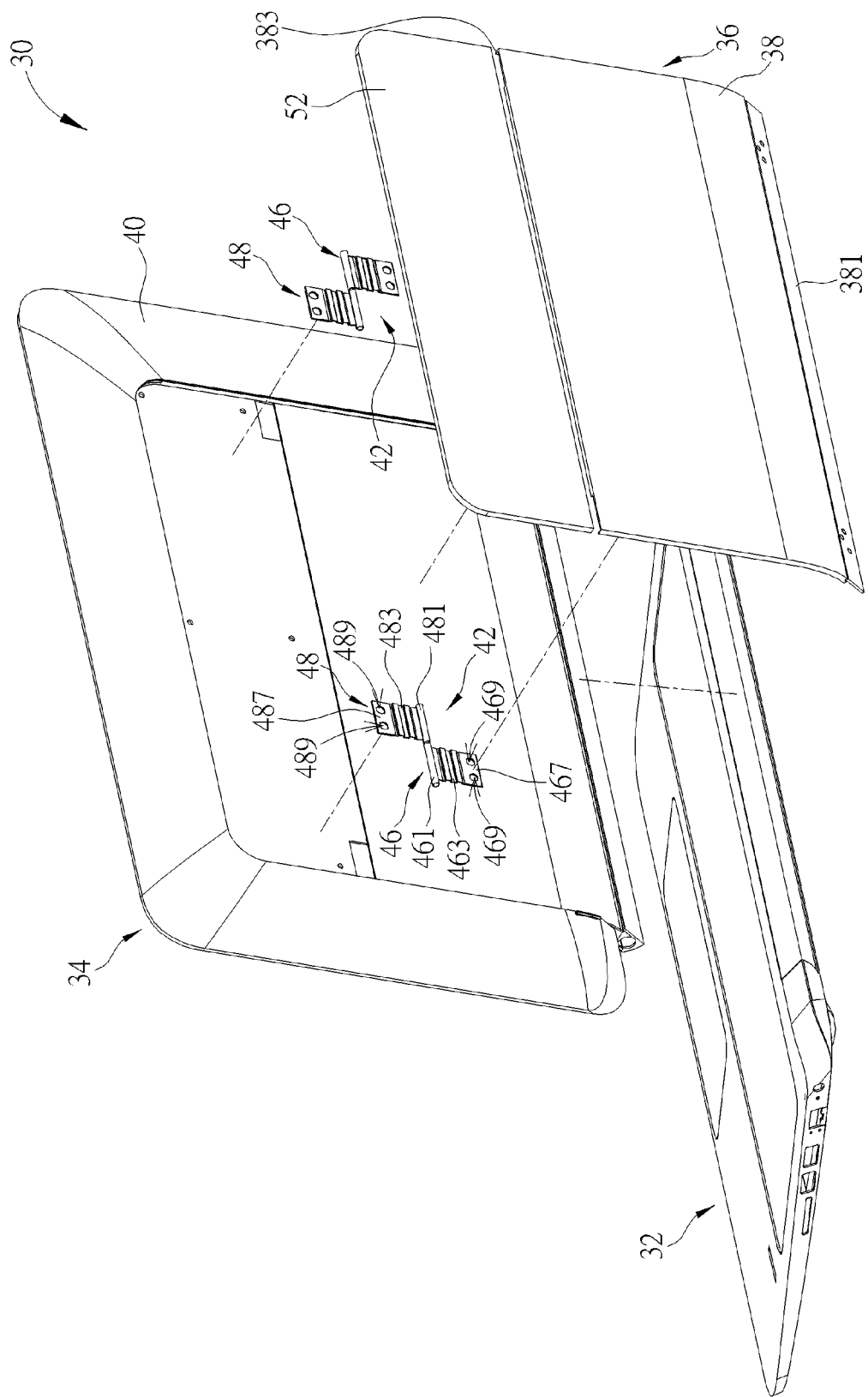
FIG. 3 is an exploded diagram of the electronic device in another view according to the embodiment of the present invention.

Please refer to FIG. 1 to FIG. 3. FIG. 1 is a diagram of an electronic device 30 in an expanded status according to an embodiment of the present invention. FIG. 2 is a diagram of the electronic device 30 in a contained status according to the embodiment of the present invention. FIG. 3 is an exploded diagram of the electronic device 30 in another view according to the embodiment of the present invention. As shown in FIG. 1 to FIG. 3, the electronic device 30 includes a first module 32, a second module 34 and a linkage member 36. The linkage member 36 includes a first casing 38, and the second module 34 includes a second casing 40. The first module 32 is pivoted to a first side 381 of the first casing 38 of the linkage member 36.

Furthermore, the electronic device 30 further includes two hinge assemblies 42 installed on a second side 383 of the first casing 38 of the linkage member 36 relative to the first side 381. The two hinge assemblies 42 are used for pivoting the second side 383 of the first casing 38 of the linkage member 36 and the second casing 40 of the second module 34, respectively. In this embodiment, the two hinge assemblies 42 are disposed on two opposite corners of the second side 383 of the first casing 38, respectively. An amount and disposal positions of the hinge assembly 42 are not limited to those illustrated in figures in this embodiment. For example, the electronic device 30 can include only one hinge assembly 42 disposed in the middle of the second side 383 of the first casing 38. In other words, structures of the electronic device 30 including at least one hinge assembly 42 are within the scope of the present invention. As for which one of the above-mentioned designs is adopted, it depends on practical demands.

When the electronic device 30 is desired to be operated, the second module 34 is rotated from a contained position shown in FIG. 2 along a first direction X1. Since the second casing 40 of the second module 34 is pivoted to the second side 383 of the first casing 38 of the linkage member 36 by the hinge assembly 42 and the first side 381 of the first casing 38 of the linkage member 36 is pivoted to the first module 32, the second module 34 and the linkage member 36 can be cooperatively rotated from the contained position shown in FIG. 2 to an expanded position shown in FIG. 1 along the first direction X1 for operation. On the other hand, when the electronic device 30 is no longer in use, the second module 34 is rotated from the expanded position shown in FIG. 1 along a second direction X2 opposite to the first direction X1. Meanwhile, the second module 34 and the linkage member 36 can be cooperatively rotated from the expanded position shown in FIG. 1 to the contained position shown in FIG. 2 along the second direction X2 for storage or carrying.

In this embodiment, the electronic device 30 is a notebook computer, the first module 32 is a host module of the notebook computer, and the second module 34 is a display module of the notebook computer. As mentioned above, when the second module 34 (i.e. the display module) rotates to the expanded position relative to the first module 32 (i.e. the host module), the first module 32 (i.e. the host module) can be operated to perform the desired motions, such as inputting words, programming and so on, while the second module 34 (i.e. the display module) can be used for displaying an operating picture for showing the motions performed by the first module 32 (i.e. the host module). In other words, when the electronic device 30 is in the expanded status shown in FIG. 1, the electronic device 30 is capable of providing the user with the notebook computer mode.

In this embodiment, the display module (i.e. the second module 34) can be further equipped with a touch module, that is, a display panel 341 of the display module (i.e. the second module 34) can be a touch panel. As a result, the touch panel (i.e. the display panel 341) of the display module (i.e. the second module 34) can be utilized for performing a touch control instruction, such as a sliding-cursor instruction, a zooming in/out instruction and so on. In other words, the electronic device 30 (i.e. the notebook computer) is capable of providing the tablet computer mode that the user can perform the touch control instruction on the touch panel (i.e. the display panel 341) of the display module (i.e. the second module 34).

Figure 4:
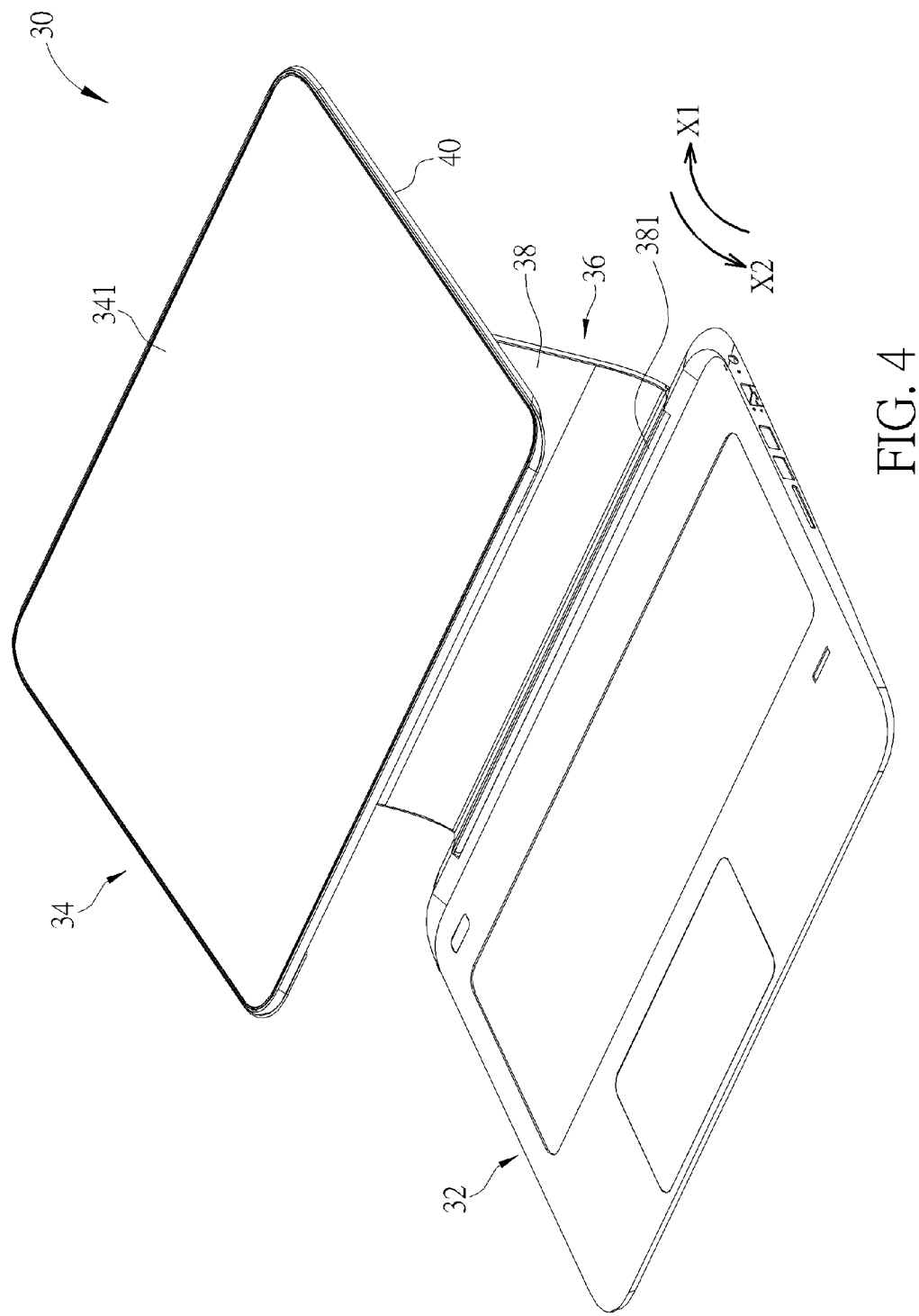
FIG. 4 to FIG. 6 are respectively diagrams of the electronic device in different statuses according to the embodiment of the present invention.
Figure 5:
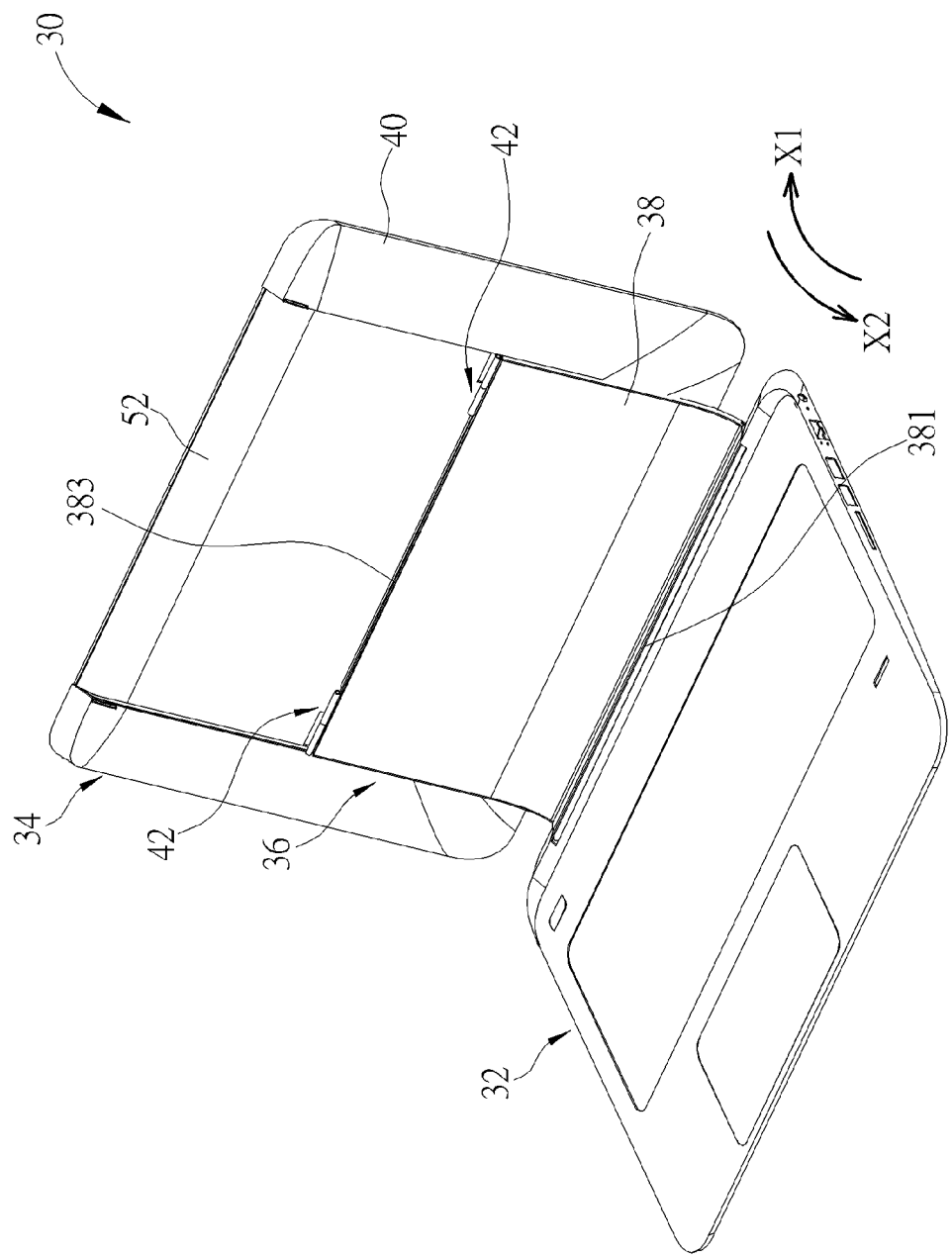
Figure 6:
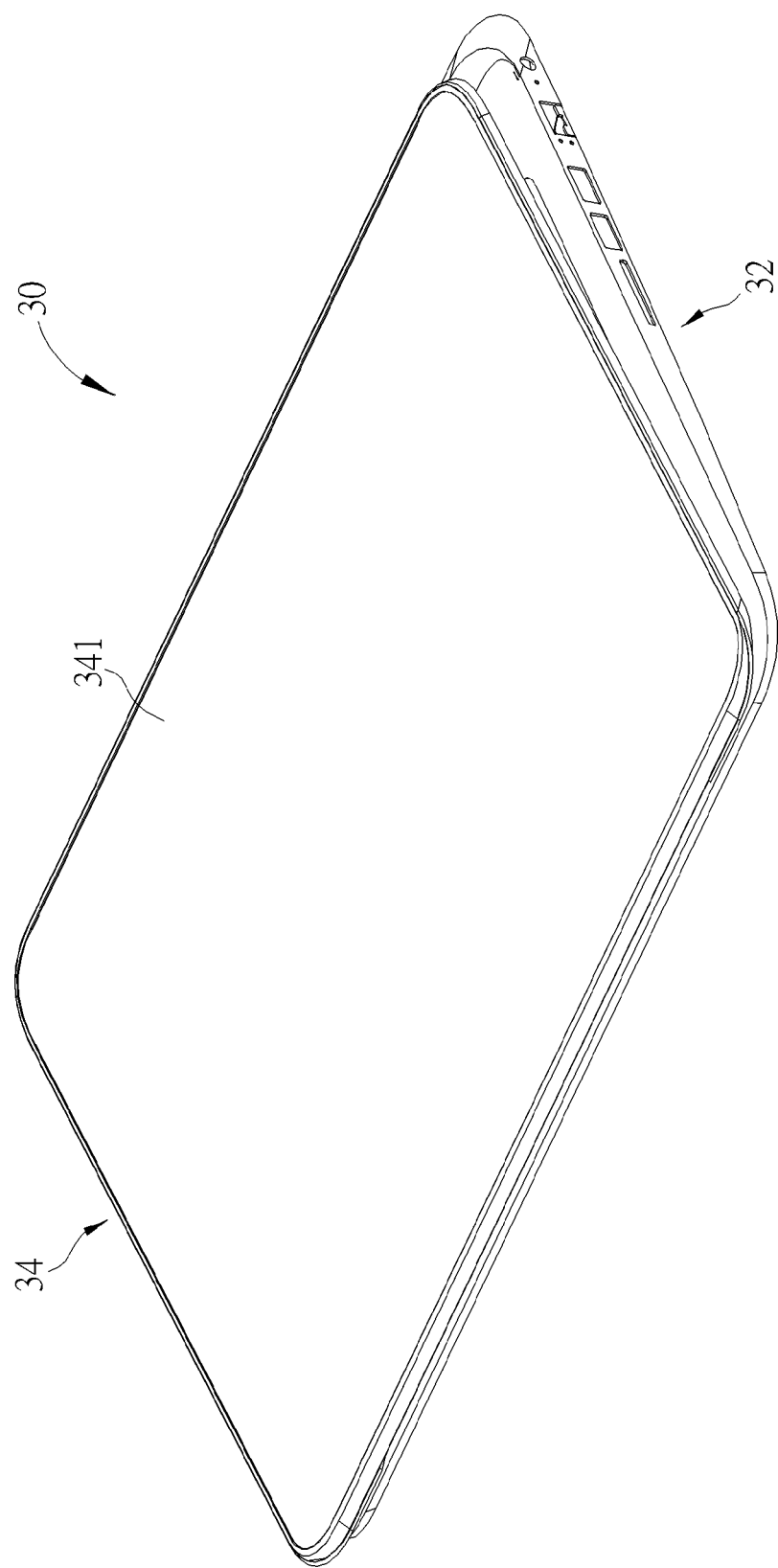

Please refer to FIG. 1 and FIG. 4 to FIG. 6. FIG. 4 to FIG. 6 are respectively diagrams of the electronic device 30 in different statuses according to the embodiment of the present invention. As shown in FIG. 1 and FIG. 4 to FIG. 6, when the electronic device 30 (i.e. the notebook computer) is desired to be operated in the tablet computer mode, the second module 34 (i.e. the display module) is rotated from the expanded position shown in FIG. 1 along the first direction X1. When the second module 34 (i.e. the display module) is located in the expanded position shown in FIG. 1, the first module 32 (i.e. the host module) stops the linkage member 36. Accordingly, the linkage member 36 is incapable of rotating along the first direction X1. Meanwhile, the second module 34 (i.e. the display module) further rotates about the second side 383 of the first casing 38 of the linkage member 36 along the first direction X1 by the hinge assembly 42. In such a manner, the second module 34 (i.e. the display module) is rotated from the expanded position shown in FIG. 1 to a position shown in FIG. 5 via a position shown in FIG. 4.

Afterwards, the second module 34 (i.e. the display module) and the linkage member 36 are rotated from the position shown in FIG. 5 to a position shown in FIG. 6 along the second direction X2. Meanwhile, the second module 34 (i.e. the display module) overlaps with and lies on the first module 32 (i.e. the host module), and the touch panel (i.e. the display panel 341) of the second module 34 (i.e. the display module) faces the user. Accordingly, the touch control instructions can be performed on the touch panel (i.e. the display panel 341) of the display module (i.e. the second module 34). In summary, the electronic device 30 (i.e. the notebook computer) of the present invention provides the user with not only the notebook computer mode but also the tablet computer mode so as to enhance flexibility of the electronic device 30 (i.e. the notebook computer) in use. Implementation of the hinge assembly 42 of the present invention is not limited to those illustrated in figures in this embodiment. For example, the hinge assembly 42 of the present invention can be implemented in a card case, i.e. the hinge assembly 42 can be used for pivoting an upper case and a lower case of the card case. As for which one of the above-mentioned designs is adopted, it depends on practical demands.

Figure 7:
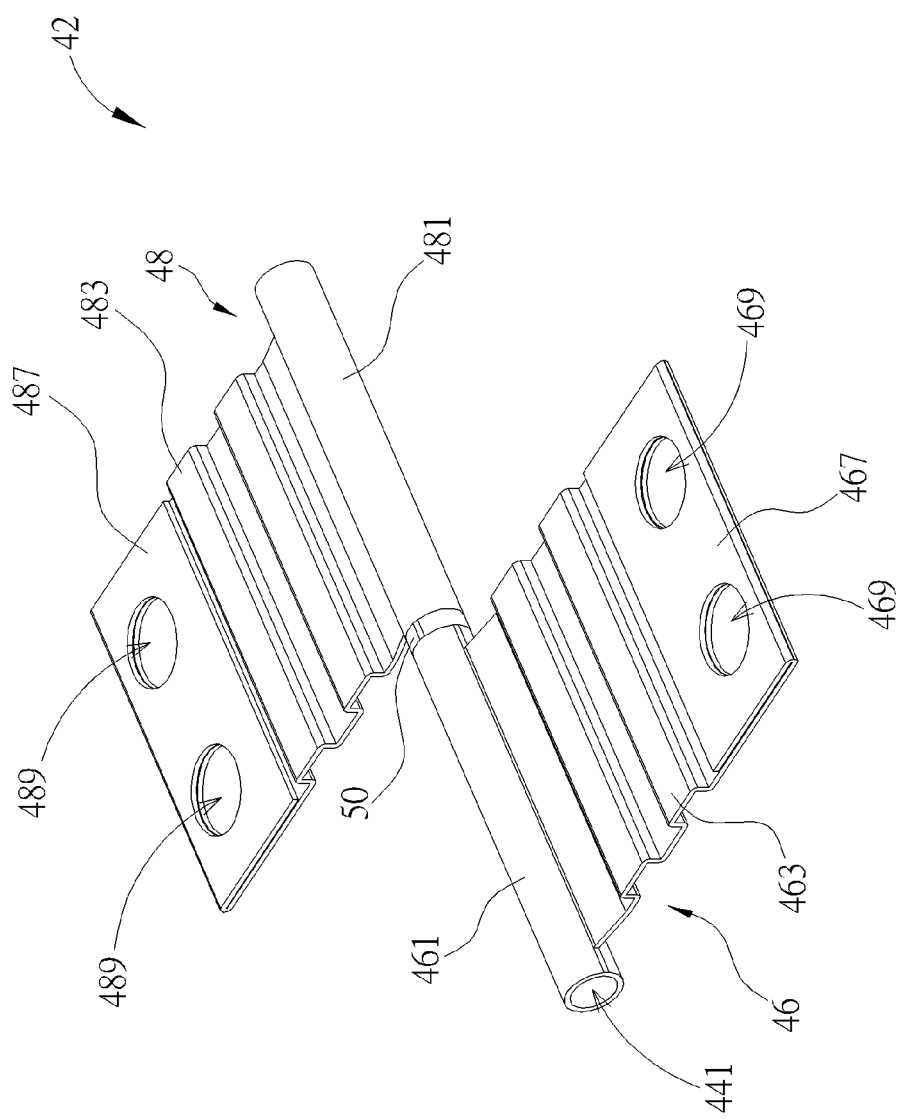
FIG. 7 is a diagram of a hinge assembly according to the embodiment of the present invention.
Figure 8:
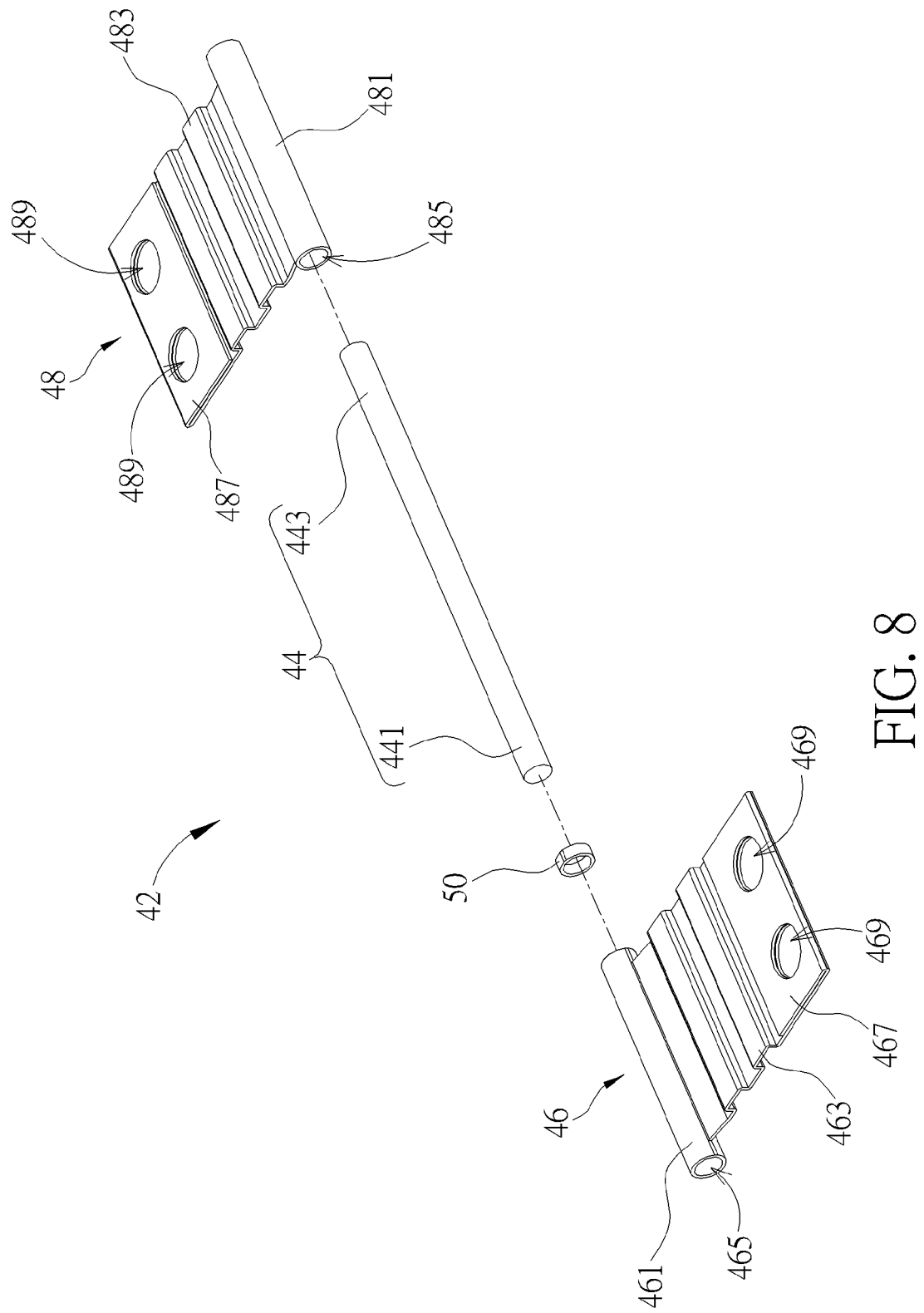
FIG. 8 is an exploded diagram of the hinge assembly according to the embodiment of the present invention.

Please refer to FIG. 3, FIG. 7 and FIG. 8. FIG. 7 is a diagram of the hinge assembly 42 according to the embodiment of the present invention. FIG. 8 is an exploded diagram of the hinge assembly 42 according to the embodiment of the present invention. As shown in FIG. 3, FIG. 7 and FIG. 8, the hinge assembly 42 includes a shaft 44, a first bracket 46 and a second bracket 48. Furthermore, the shaft 44 includes a first rod portion 441 and a second rod portion 443. The first bracket 46 includes a first rotating portion 461 and a first flexibly connecting portion 463. The second bracket 48 includes a second rotating portion 481 and a second flexibly connecting portion 483. The first rotating portion 461 of the first bracket 46 is pivoted to the first rod portion 441 of the shaft 44, and the first flexibly connecting portion 463 extends from the first rotating portion 461. The second rotating portion 481 of the second bracket 48 is pivoted to the second rod portion 443 of the shaft 44, and the second flexibly connecting portion 483 extends from the second rotating portion 481.

As shown in FIG. 8, a first pivotal hole 465 is formed on the first rotating portion 461 of the first bracket 46, and a second pivotal hole 485 is formed on the second rotating portion 481 of the second bracket 48. The first pivotal hole 465 is used for rotably sheathing the first rod portion 441 of the shaft 44 such that the first rotating portion 461 of the first bracket 46 is pivoted to the first rod portion 441 of the shaft 44. The second pivotal hole 485 is used for rotably sheathing the second rod portion 443 of the shaft 44 such that the second rotating portion 481 of the second bracket 48 is pivoted to the second rod portion 443 of the shaft 44. Since the first rotating portion 461 of the first bracket 46 is pivoted to the first rod portion 441 of the shaft 44, the first bracket 46 is rotable relative to the shaft 44. Since the second rotating portion 481 of the second bracket 48 is pivoted to the second rod portion 443 of the shaft 44, the second bracket 48 is rotable relative to the shaft 44. In summary, since the first bracket 46 and the second bracket 48 are respectively pivoted to the shaft 44, the first bracket 46 is rotable relative to the second bracket 48.

In addition, the hinge assembly 42 further includes a bushing member 50 sheathing the shaft 44, and two sides of the bushing member 50 respectively abut against the first rotating portion 461 of the first bracket 46 and the second rotating portion 481 of the second bracket 48. When the first bracket 46 rotates relative to the second bracket 48, the bushing member 50 can prevent the first rotating portion 461 of the first bracket 46 from rubbing against the second rotating portion 481 of the second bracket 48 so as to prevent abrasions between the first rotating portion 461 and the second rotating portion 481 and further to enhance life of the hinge assembly 42.

As shown in FIG. 3, FIG. 7 and FIG. 8, the first bracket 46 of the hinge assembly 42 further includes a first fixing portion 467 connecting the first flexibly connecting portion 463 and for fixing on the first casing 38 of the linkage member 36 such that the first bracket 46 is fixed on the first casing 38. In addition, the second bracket 48 of the hinge assembly 42 further includes a second fixing portion 487 connecting the second flexibly connecting portion 483 and for fixing on the second casing 40 of the second module 34 such that the second bracket 48 is fixed on the second casing 40. In this embodiment, two first through holes 469 are formed on the first fixing portion 467, and two second through holes 489 are formed on the second fixing portion 487. The first through holes 469 and the second through holes 489 allow screws to pass through. In such a manner, the screws are capable of screwing on the first casing 38 and the second casing 40 after passing through the first through holes 469 and the second through holes 489 such that the first fixing portion 467 and the second fixing portion 487 are respectively fixed on the first casing 38 and the second casing 40.

Amounts of the first through hole 469 and the second through hole 489 are not limited to those illustrated in figures in this embodiment. For example, there can be only one first through hole 469 formed on the first fixing portion 467 and only one second through hole 489 formed on the second fixing portion 487 as well. In other words, structures that at least one first through hole 469 is formed on the first fixing portion 467 and at least one second through hole 489 is formed on the second fixing portion 487 are within the scope of the present invention. In this embodiment, the first fixing portion 467 and the second fixing portion 487 are respectively fixed on the first casing 38 and the second casing 40 in a screwed manner. Structures of the first fixing portion 467 and the second fixing portion 487 are not limited to those illustrated in figures in this embodiment. For example, the first fixing portion 467 and the second fixing portion 487 can be respectively fixed on the first casing 38 and the second casing 40 in a hooking manner. As for which one of the above-mentioned designs is adopted, it depends on practical demands.

More detailed descriptions for principle of the hinge assembly 42 are provided as follows. Please refer to FIG. 9 to FIG. 14. FIG. 9 to FIG. 14 are sectional diagrams of the electronic device 30 in different statuses according to the embodiment of the present invention. As shown in FIG. 9 to FIG. 14, when the electronic device 30 is desired to be operated in the tablet computer mode, the second module 34 is rotated from the expanded position shown in FIG. 9 along the first direction X1. In the process of the above rotation, the linkage member 36 is stopped rotating along the first direction X1 by the first module 32. Meanwhile, the second module 34 and the second casing 40 thereof further rotates relative to the first casing 38 of the linkage member 36 along the first direction X1 by the hinge assembly 42.

Figure 9:
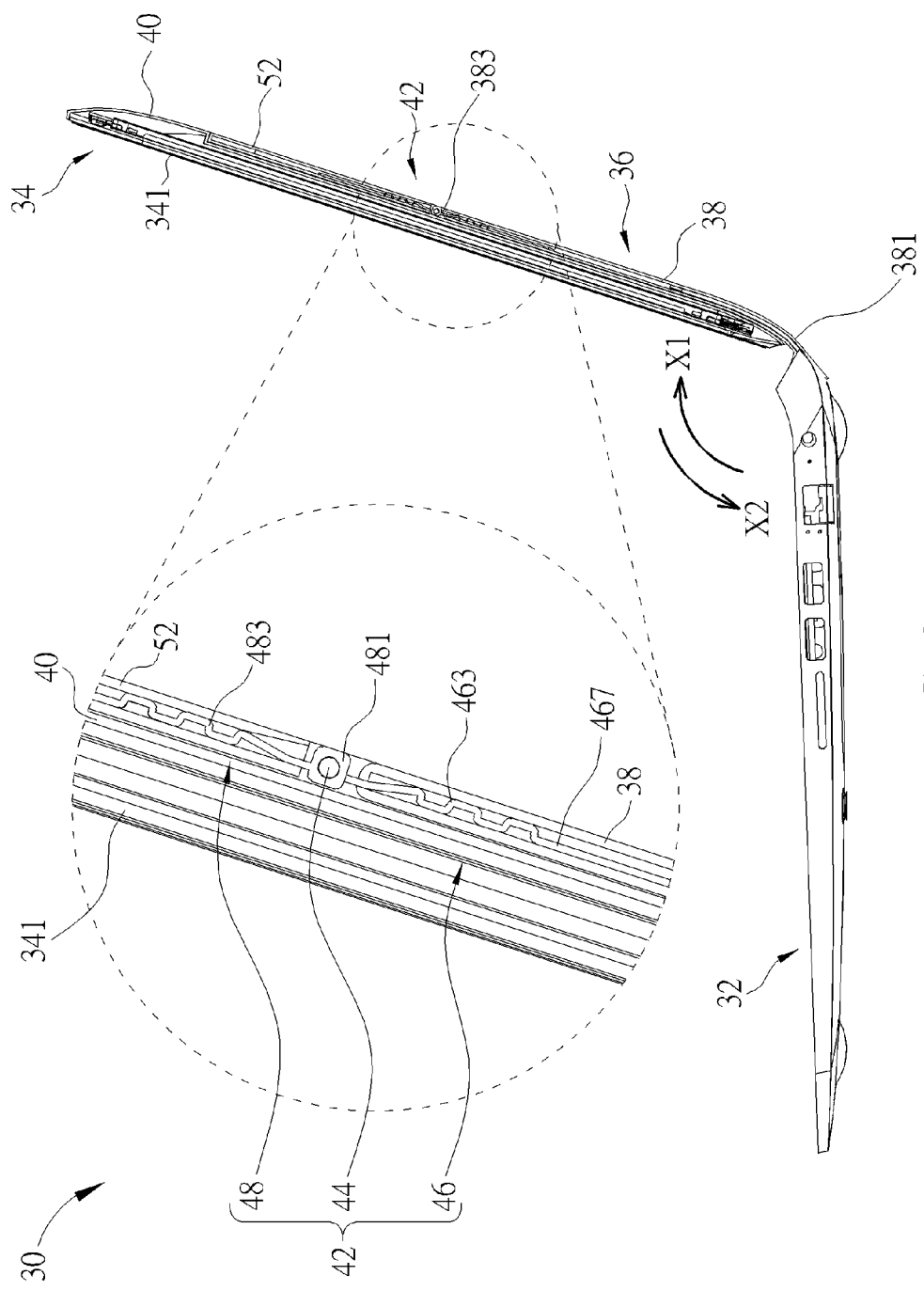
FIG. 9 to FIG. 14 are sectional diagrams of the electronic device in different statuses according to the embodiment of the present invention.
Figure 10:
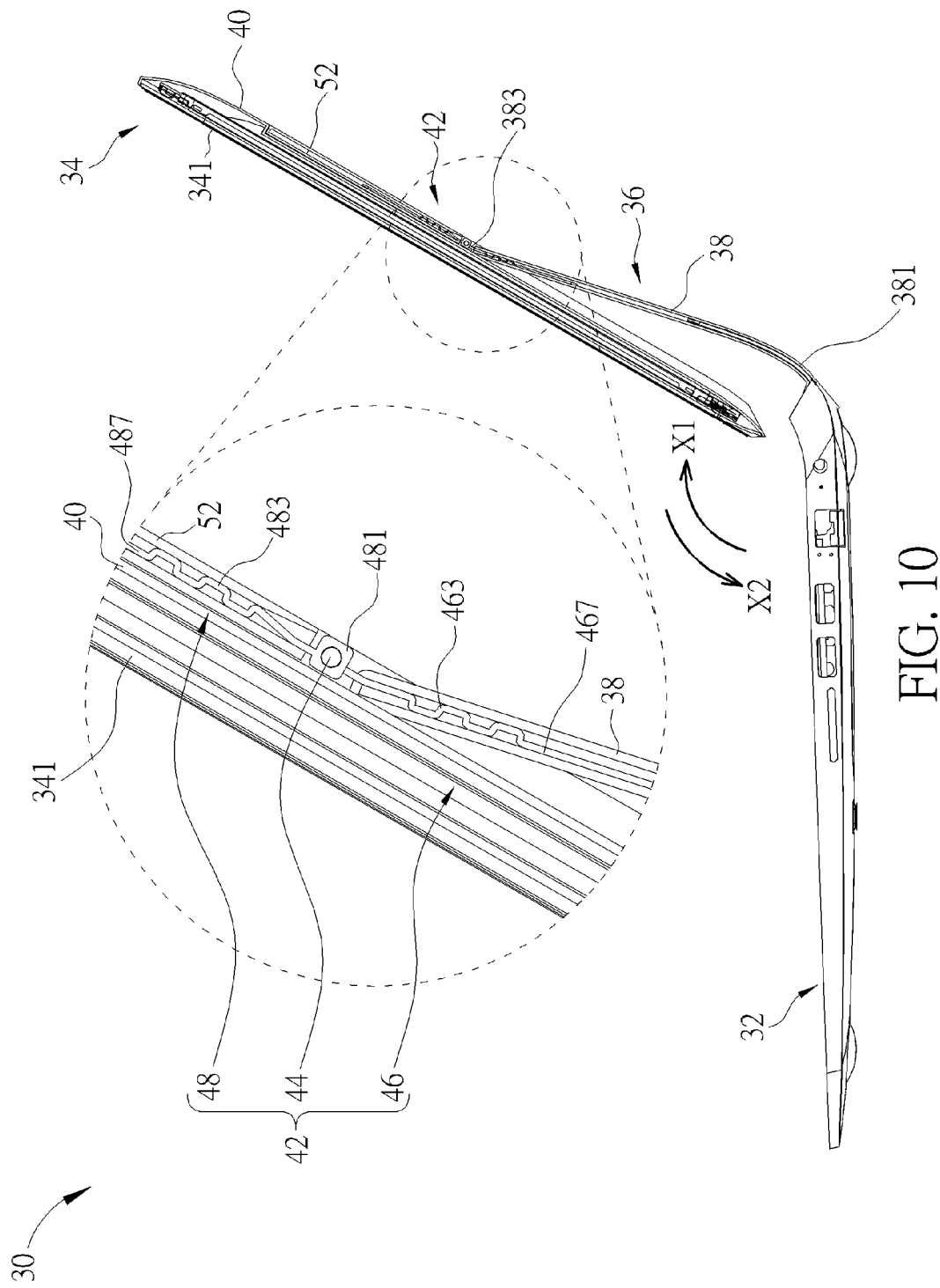

Furthermore, in the process that the second casing 40 of the second module 34 rotates relative to the first casing 38 of the linkage member 36 along the first direction X1 from the expanded position shown in FIG. 9 to a position shown in FIG. 10, the second casing 40 activates the second bracket 48 to drive the shaft 44 so as to activate the first rotating portion 461 of the first bracket 46 to displace. Since the first flexibly connecting portion 463 of the first bracket 46 is connected to the first rotating portion 461, the shaft 44 activated by the first rotating portion 461 stretches and bends the first flexibly connecting portion 463, as shown in FIG. 10. In other words, in the process that the second casing 40 rotates relative to the first casing 38 along the first direction X1 from the expanded position shown in FIG. 9 to the position shown in FIG. 10, the second bracket 48 is used for driving the shaft 44 to activate the first rotating portion 461 of the first bracket 46 such that the first flexibly connecting portion 463 of the first bracket 46 is stretched and bent and the shaft 44 of the hinge assembly 42 is moved.

Figure 11:
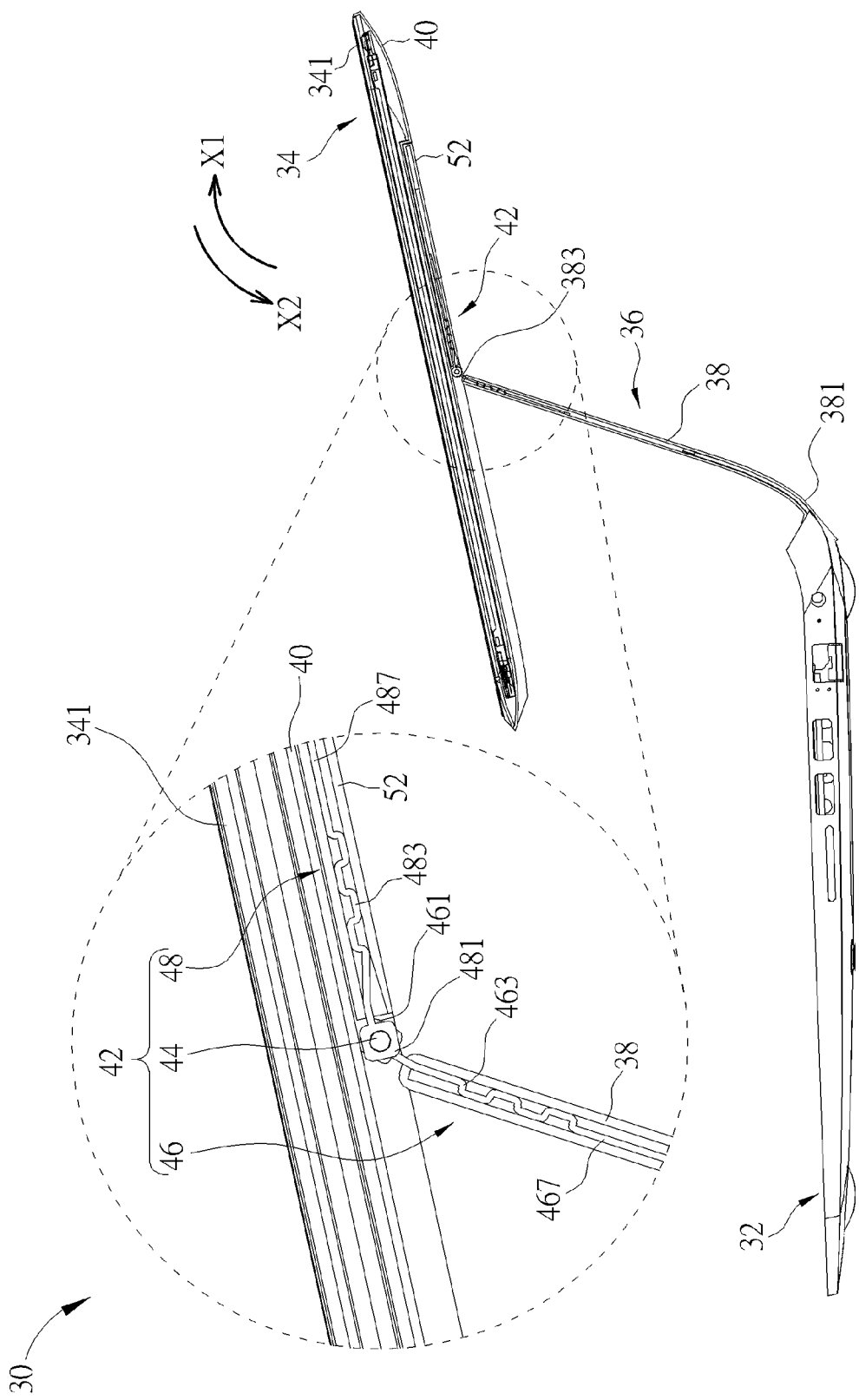

Furthermore, in the process that the second casing 40 of the second module 34 continues to rotate relative to the first casing 38 of the linkage member 36 along the first direction X1 from the position shown in FIG. 10 to a position shown in FIG. 11, an angle between the second casing 40 and the first casing 38 increases gradually, and thus the second bracket 48 fixed on the second casing 40 starts to rotate relative to the first bracket 46 fixed on the first casing 38. Meanwhile, the second fixing portion 487 of the second bracket 48 can be further activated to stretch and bend the second flexibly connecting portion 483 so as to further displace and move the shaft 44 of the hinge assembly 42. Accordingly, the shaft 44 can displace and move to a side of the first casing 38 of the linkage member 36 by the above rotation, as shown in FIG. 11.

Figure 12:
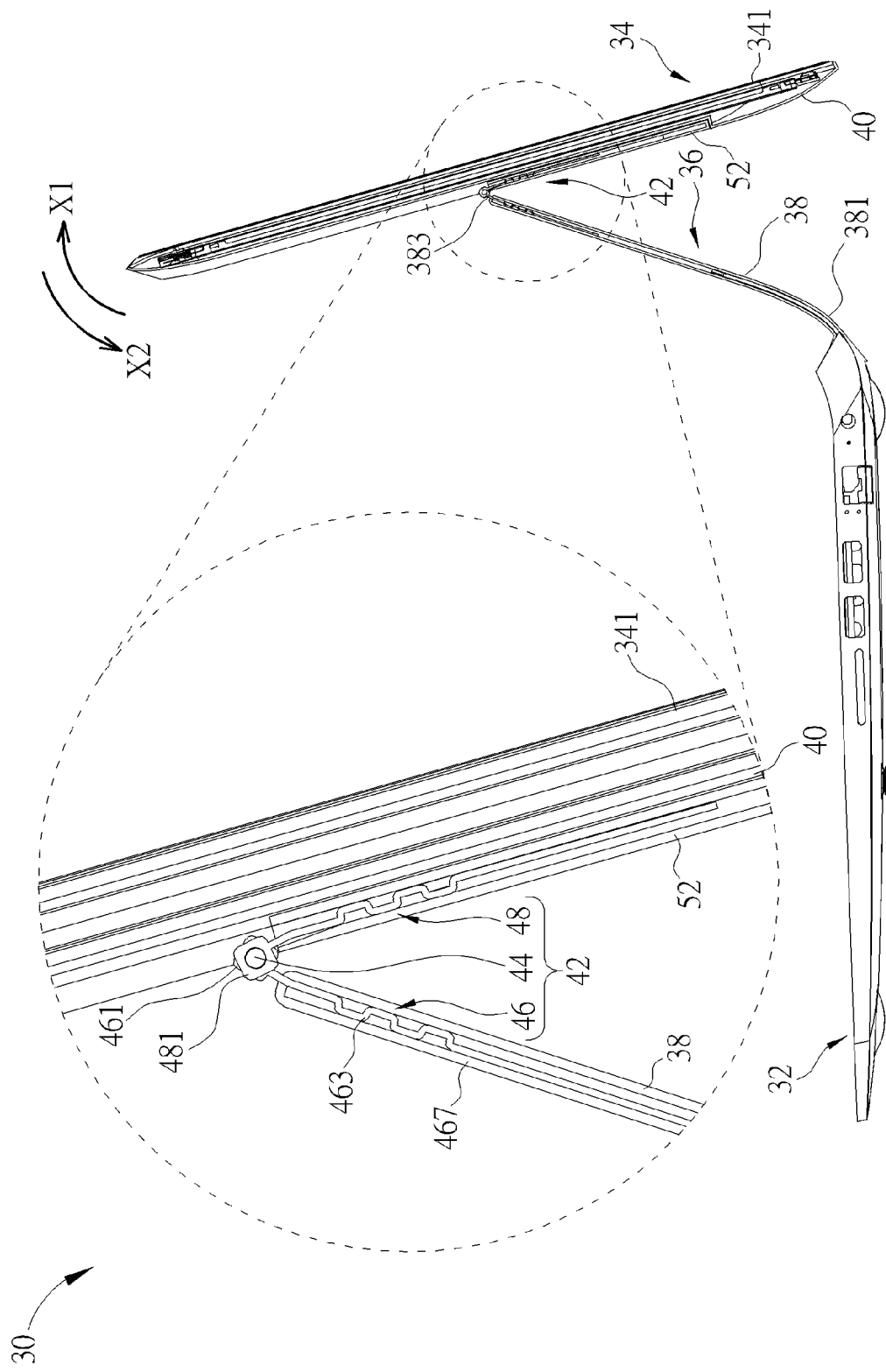
Figure 13:
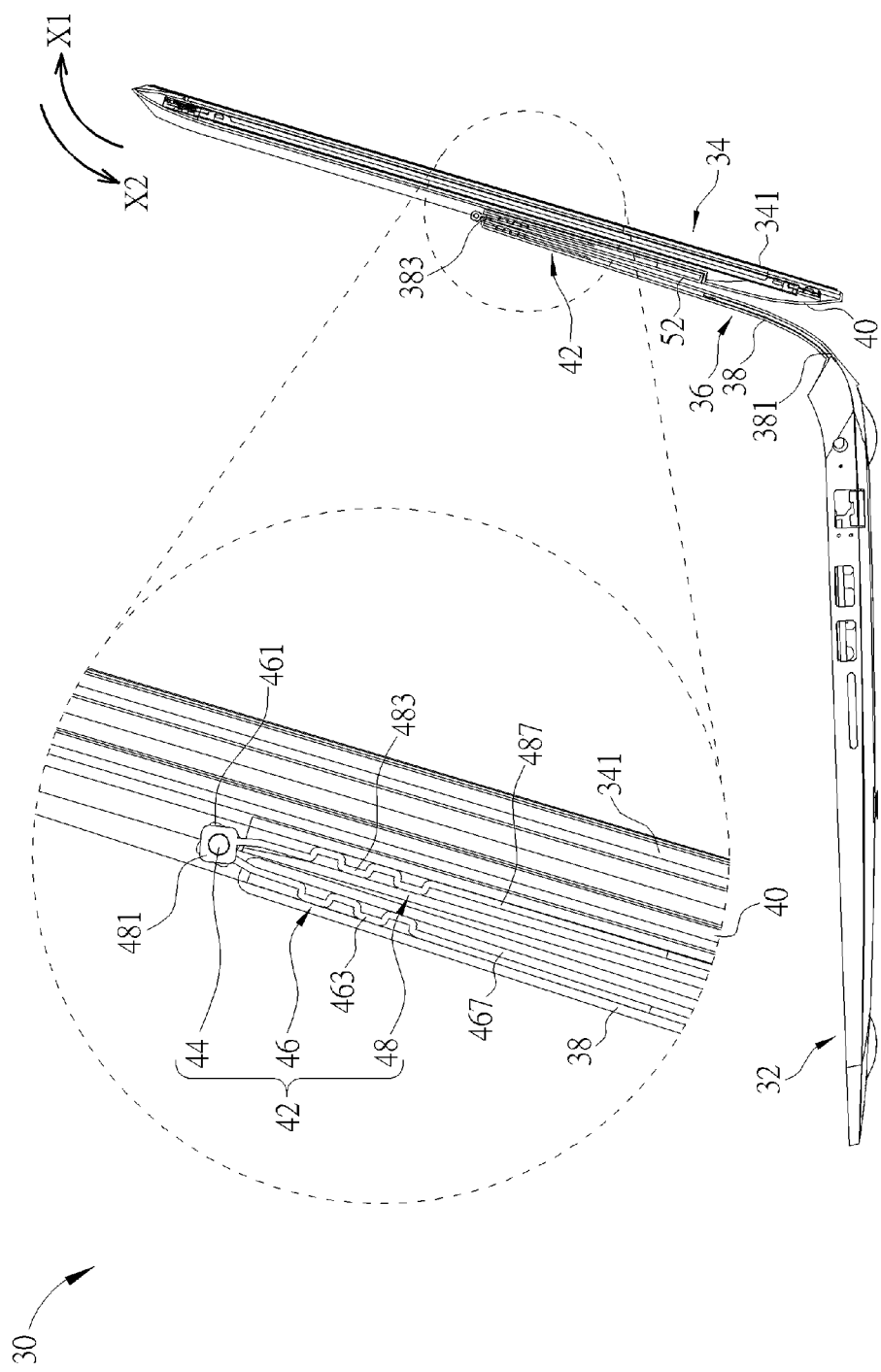

In such a manner, when the second module 34 continues to rotate relative to the linkage member 36 along the first direction X1, the second casing 40 of the second module 34 rotates relative to the first casing 38 of the linkage member 36 from the position shown in FIG. 11 to a position shown in FIG. 13 via a position shown in FIG. 12. Since the shaft 44 is located on the side of the first casing 38, as shown in FIG. 11, in the process of the above rotation, the second casing 40 of the second module 34 overlaps with and lies on the first casing 38 of the linkage member 36, as shown in FIG. 13, when the hinge assembly 42 is in the status shown in FIG. 13. In other words, in the process that the second casing 40 rotates relative to the first casing 38 along the first direction X1, the first flexibly connecting portion 463 and the second flexibly connecting portion 483 of the hinge assembly 42 of the present invention are stretched and bent so as to displace and move the shaft 44 of the hinge assembly 42 to the side of the first casing 38. In this embodiment, the first flexibly connecting portion 463 and the second flexibly connecting portion 483 are respectively a substantially wave-shaped structure, which can be stretched and bent duo to application of an external force so as to change an axis position of the shaft 44.

In such a manner, the second casing 40 is capable of rotating relative to the first casing 38 so as to overlap with and to lie on the first casing 38, i.e. the shaft 44 of the hinge assembly 42 of the present invention displaces and moves when the second casing 40 rotates relative to the first casing 38 such that the second casing 40 rotates relative to the first casing 38 for overlapping with and lying on the first casing 38. In other words, the hinge assembly 42 of the present invention utilizes stretching and bending of the first flexibly connecting portion 463 and the second flexibly connecting portion 483 for changing the axis position of the shaft 44 such that the second casing 40 does not interfere with the first casing 38 when the second casing 40 rotates relative to the first casing 38 to the position shown in FIG. 13. In such a manner, it does not need to form a recess on the second casing 40. Thus, it improves an appearance issue of electronic device 30 resulting from the recess and advantages the electronic device 30 in the market.

Figure 14:
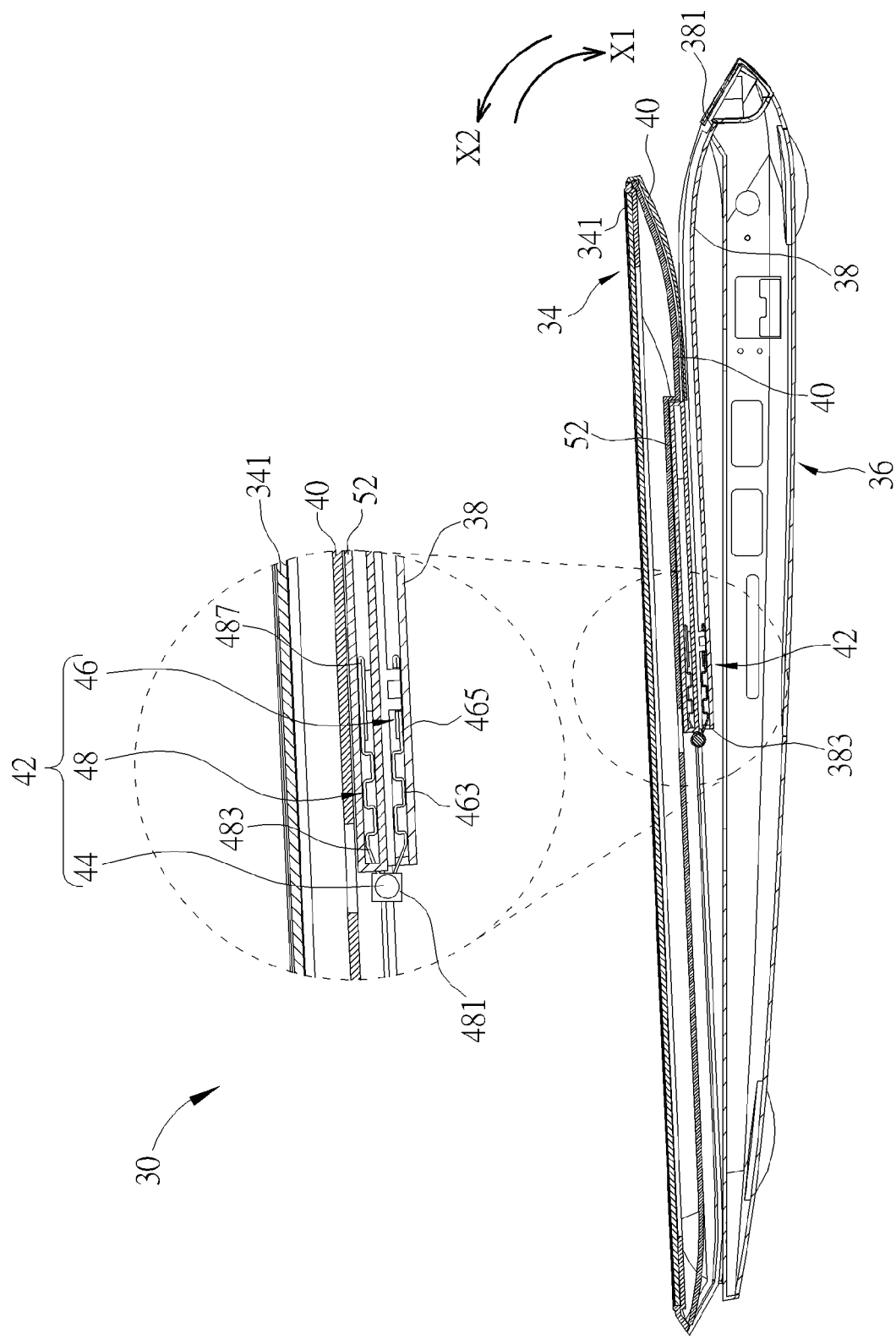

It should be noticed that the second casing 40 of the second module 34 can further include a covering member 52 for covering the second bracket 48 of the hinge assembly 42. Accordingly, when the second module 34 rotates relative to the first module 32, the hinge assembly 42 is not exposed, and thus it keeps unity of the appearance of the second module 34. In this embodiment, the covering member 52 is installed on the second casing 40 in a hooking manner, but structures of the covering member 52 and the second casing 40 are not limited to those illustrated in figures in this embodiment. For example, the covering member 52 and the second casing 40 can be integrally formed as well. As for which one of the above-mentioned designs is adopted, it depends on practical demands. Finally, the second module 34 and the linkage member 36 are rotated relative to the first module 32 from the position shown in FIG. 13 to a position shown in FIG. 14. Accordingly, the second module 34 overlaps with and lies on the first module 32, as shown in FIG. 6 and FIG. 14, for the user to operate the touch control instructions on the display panel 341 of the second module 34.

Compared to the prior art, in the process that the second casing rotates relative to the first casing along the first direction, the first flexibly connecting portion and the second flexibly connecting portion of the hinge assembly of the present invention are stretched and bent so as to displace and move the shaft of the hinge assembly to the side of the first casing. In other words, the shaft of the hinge assembly of the present invention displaces and moves when the second casing rotates relative to the first casing such that the second casing rotates relative to the first casing for overlapping with and lying on the first casing. In other words, the hinge assembly of the present invention is capable of changing the axis position of the shaft such that the second casing does not interfere with the first casing when the second casing rotates relative to the first casing. In such a manner, it does not need to form a recess on the second casing. Thus, it improves an appearance issue of electronic device resulting from the recess and advantages the electronic device in the market.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hinge assembly, comprising:
   a shaft comprising a first rod portion and a second rod portion;
   a first bracket comprising a first rotating portion, a first flexibly connecting portion and a first fixing portion, the first rotating portion being rotatably connected to the first rod portion of the shaft, and the first flexibly connecting portion extending from the first rotating portion, and the first fixing portion being connected to the first flexibly connecting portion and fixed on a first casing; and
   a second bracket comprising a second rotating portion, a second flexibly connecting portion and a second fixing portion, the second rotating portion being rotatably connected to the second rod portion of the shaft, the second flexibly connecting portion extending from the second rotating portion, the second fixing portion being connected to the second flexibly portion and fixed on a second casing, the second casing driving the second bracket to move the shaft when the second casing rotates relative to the first casing such that the first rotating portion is moved to stretch and bend the first flexibly connecting portion, and the second fixing portion is moved to stretch and bend the second flexibly connecting portion when the second casing rotates relative to the first casing and the second bracket rotates relative to the first bracket.

2. The hinge assembly of claim 1, wherein at least one first through hole is formed on the first fixing portion and for fixing on the first casing, and at least one second through hole is formed on the second fixing portion and for fixing on the second casing.

3. The hinge assembly of claim 1, further comprising:
a bushing member sheathing the shaft, and two ends of the bushing member respectively abutting against the first rotating portion of the first bracket and the second rotating portion of the second bracket.

4. The hinge assembly of claim 1, wherein a first pivotal hole is formed on the first rotating portion, the first pivotal hole is for rotably sheathing the first rod portion of the shaft, a second pivotal hole is formed on the second rotating portion, and the second pivotal hole is for rotably sheathing the second rod portion of the shaft.

5. The hinge assembly of claim 1, wherein the first flexibly connecting portion and the second flexibly connecting portion are respectively a substantially wave-shaped structure.

6. The hinge assembly of claim 1, wherein the first flexibly connecting portion is a substantially wave-shaped structure.

7. An electronic device, comprising:
a linkage member comprising a first casing;
a first module pivoted to a first side of the first casing;
a second module comprising a second casing; and
a hinge assembly installed on a second side of the first casing relative to the first side and for pivoting the linkage member and the second module, the hinge assembly comprising:
a shaft comprising a first rod portion and a second rod portion;
a first bracket comprising a first rotating portion, a first flexibly connecting portion and a first fixing portion, the first rotating portion being rotatably connected to the first rod portion of the shaft, the first flexibly connecting portion extending from the first rotating portion, and the first fixing portion being connected to the first flexibly connecting portion and fixed on the first casing; and
a second bracket comprising a second rotating portion, a second flexibly connecting portion and a second fixing portion, the second rotating portion being rotatably connected to the second rod portion of the shaft, the second flexibly connecting portion extending from the second rotating portion, the second fixing portion being connected to the second flexibly portion and fixed on a second casing, the second casing driving the second bracket to move the shaft when the second casing rotates relative to the first casing such that the first rotating portion is moved to stretch and bend the first flexibly connecting portion, and the second fixing portion is moved to stretch and bend the second flexibly connecting portion when the second casing rotates relative to the first casing and the second bracket rotates relative to the first bracket.

8. The electronic device of claim 7, wherein at least one first through hole is formed on the first fixing portion and for fixing on the first casing, and at least one second through hole is formed on the second fixing portion and for fixing on the second casing.

9. The electronic device of claim 7, wherein the hinge assembly further comprises:
a bushing member sheathing the shaft, and two ends of the bushing member respectively abutting against the first rotating portion of the first bracket and the second rotating portion of the second bracket.

10. The electronic device of claim 7, wherein a first pivotal hole is formed on the first rotating portion, the first pivotal hole is for rotably sheathing the first rod portion of the shaft, a second pivotal hole is formed on the second rotating portion, and the second pivotal hole is for rotably sheathing the second rod portion of the shaft.

11. The electronic device of claim 7, wherein the first flexibly connecting portion and the second flexibly connecting portion are respectively a substantially wave-shaped structure.

12. The electronic device of claim 7, wherein the first flexibly connecting portion is a substantially wave-shaped structure.

13. The electronic device of claim 7, wherein the first module is a host module, and the second module is a display module.

* * * * *